(12) United States Patent
Bennett et al.

(10) Patent No.: US 6,779,550 B1
(45) Date of Patent: Aug. 24, 2004

(54) MAGNETIC PULSE WELDER PRESSURE CANISTER

(75) Inventors: Richard A. Bennett, Smithtown, NY (US); Robert L. Benoit, Oakdale, NY (US); Bernard I. Rachowitz, Lloyd Neck, NY (US); Anthony Mascolo, Islip Terrace, NY (US)

(73) Assignee: Fuel Cell Components & Integrators, Inc., Hauppauge, NY (US)

( * ) Notice: Subject to any disclaimer, the term of this patent is extended or adjusted under 35 U.S.C. 154(b) by 178 days.

(21) Appl. No.: 10/082,734

(22) Filed: Feb. 26, 2002

(51) Int. Cl.[7] .................................................. B65D 6/32
(52) U.S. Cl. ........................ 137/255; 220/611; 220/612
(58) Field of Search .......................... 137/255; 220/613, 220/916, 612, 611, 789

(56) References Cited

U.S. PATENT DOCUMENTS

| | | | |
|---|---|---|---|
| 3,520,049 A | * | 7/1970 | Lysenko et al. ............ 219/617 |
| 3,837,755 A | | 9/1974 | Benoit et al. |
| 4,523,872 A | | 6/1985 | Arena et al. |
| 5,979,694 A | | 11/1999 | Bennett et al. |
| 6,539,745 B1 | * | 4/2003 | Harmer et al. ............. 62/503 |

* cited by examiner

Primary Examiner—Kevin Lee
(74) Attorney, Agent, or Firm—Mark Levy & Associates (57) ABSTRACT

A pressure vessel or pressurizable canister has a hollow, thin-walled, cylindrical metal shell or tube. Two end caps are hermetically sealed to the respective distal ends of the metal shell by the process of magnetic pulse welding that requires no external heat. The two end caps are made of a metallic alloy such as aluminum. The end caps are each cylindrically shaped and have at least one circumferential recess to accommodate the metal of the shell tube as it deforms about the end caps and forms an intermolecular bond. The canister can hold a pressure of at least 1,800 psi.

17 Claims, 12 Drawing Sheets

Prior Art

Prior Art

Prior Art

MAGNETIC PULSE WELDER PRESSURE CANISTER

RELATED PATENTS

The present patent application is related to U.S. Pat. No. 5,979,694 for PRESSURE CANISTER, granted to Richard A. Bennett et al. on Nov. 9, 1999 and hereby incorporated by reference.

FIELD OF THE INVENTION

The present invention relates to pressure canisters and, more particularly, to an improved, lightweight pressure canister having a corrosion-resistant tube body that is magnetic pulse welded about a pair of distally disposed end caps.

BACKGROUND OF THE INVENTION

The art of fabricating containers and vessels has its roots in antiquity. In modern times, containers and vessels of all types, shapes, and sizes are fabricated to meet the needs of a rapidly expanding world economy. The present invention relates to the manufacture of lightweight canisters capable of storing materials under a pressure of at least approximately 1,800 psi.

The typical method of fabricating pressure-type canisters is to weld a pair of distally placed closure elements, or end caps, to a metal shell body. However, lightweight aluminum canister tube bodies are not conducive to conventional welding. Heretofore, aluminum welding had to be performed in an expensive, inert atmosphere of argon to prevent an oxide coat from forming and interfering with the weld process. More importantly, aluminum tends to anneal and weaken when subjected to welding temperatures, thus necessitating a thicker shell body. The thicker shell adds weight and cost to the finished product and defeats the lightweight objective. The thicker tube shell has the obvious further disadvantage of reducing the amount of material that can be stored in the canister.

U.S. Pat. No. 5,979,694, issued to Bennett et al., discloses a lightweight aluminum canister that forms a mechanical seal with its end caps by electromagnetic forming. In electromagnetic forming, an electric coil is placed around a metal body, and is thereafter electrically pulsed to create a magnetic field that shapes the metal. In the aforementioned patent, coils are placed about the distal ends of the shell tube. The coil is then electrified with a high energy voltage pulse of short duration, which magnetically forms and mechanically seals the shell body about the end caps. A typical electromagnetic forming process is also described in U.S. Pat. No. 3,837,755, issued to Benoit et al. on Sep. 24, 1974, entitled MULTI-PIECE ROD FOR CONTROL AND STRUCTURAL MEMBERS; and U.S. Pat. No. 4,523,872, issued to Arena et al. on Jun. 18, 1985, entitled TORSION RESISTANT GROOVED JOINT.

The end caps used in the pressure canister of the Bennett et al. '694 patent can be formed from a variety of metallic or non-metallic materials, preferably the end cap material being a plastic material. A suitable plastic that was chosen with the required attributes of light weight, strength, and ductility was Delrin®, an injection moldable thermoplastic, fabricated from an acetal resin.

The present invention reflects the discovery that magnetic pulse welding can be used to hermetically seal end caps to the metal shell body. In this instance, higher internal pressures can be sustained over the aforementioned electromagnetically formed design, as the O-ring is eliminated. Tests have shown such pressure canisters to sustain internal pressures in excess of 1,800 psi without failure. Typically, the joint is stronger than the weakest material. Therefore, in an overpressure situation, the aluminum tube bursts away from the magnetic pulse welded joint while the joint itself remains intact. End caps are made of lightweight metal alloy materials, such as aluminum. The magnetic pulse welding process is similar to electromagnetic forming in that the joining technique occurs with an absence of heat. Thus, like the electromagnetic forming process, thinner material can be used in the inventive system for the cylindrical metal shell body, because no localized annealing of the metal occurs due to heating effects, as is common in conventional welding. Although the end caps can be made of most ferrous and non-ferrous metals, in the preferred embodiment the end caps are made of aluminum for weight and cost considerations.

SUMMARY OF THE INVENTION

It is an object of this invention to provide an improved pressurizable canister for storing and dispensing volatile materials under pressure.

It is a further object of this invention to provide a lightweight, metal, pressurizable canister that does not require conventional welding of the end caps, but uses instead a magnetic pulse welding technique.

In accordance with the present invention, there is provided a pressure vessel, or pressurizable canister. The canister comprises a hollow, thin-walled, cylindrical metal shell. The preferred metal is aluminum since light weight is a consideration for the vessel. Two metallic end caps are mechanically sealed to the respective distal ends of the metal shell tube by the process of magnetic pulse welding. The end caps are each cylindrically shaped, and have at least one circumferential recess to accommodate the metal of the shell tube as it deforms about the end caps. The tube shrinks into the recess of the end caps, and forms an intermolecular bond/weld between the tube and end cap. The top end cap may have an integrally formed mounting abutment that has a screw thread for attachment purposes. In this instance, a second recess is concentrically disposed in the facial surface of the top end cap in proximity to the mounting abutment.

In alternative design, a quick disconnect and pressure relief valve are combined in the same end-cap or alternatively one valve may be disposed in each cap. In yet another embodiment, multiple canisters can be connected to a manifold via pipe nipples and a single quick disconnect and pressure relief valve used in the manifold. No integrally formed mounting abutment and no face seal are required.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same designation and numbering throughout the figures.

DESCRIPTION OF THE PREFERRED EMBODIMENT

Generally speaking, the invention features a pressure vessel used to store hydrides and other volatile materials. The vessel comprises a cylindrical canister that has a lightweight aluminum shell. The shell is mechanically joined to a pair of distally placed, metallic end caps via a magnetic pulse welding process. The canister is designed to store, and thereafter dispense, the hydrogen gas from the hydride material at an approximate pressure of at least 1,800 psi.

The lightweight aluminum shell is magnetic pulse welded to metallic end caps, thereby creating a hermetically sealed canister capable of sustaining internal pressures of at least 1,800 psi and even exceeding 2,000 psi without failure.

Figure 1:
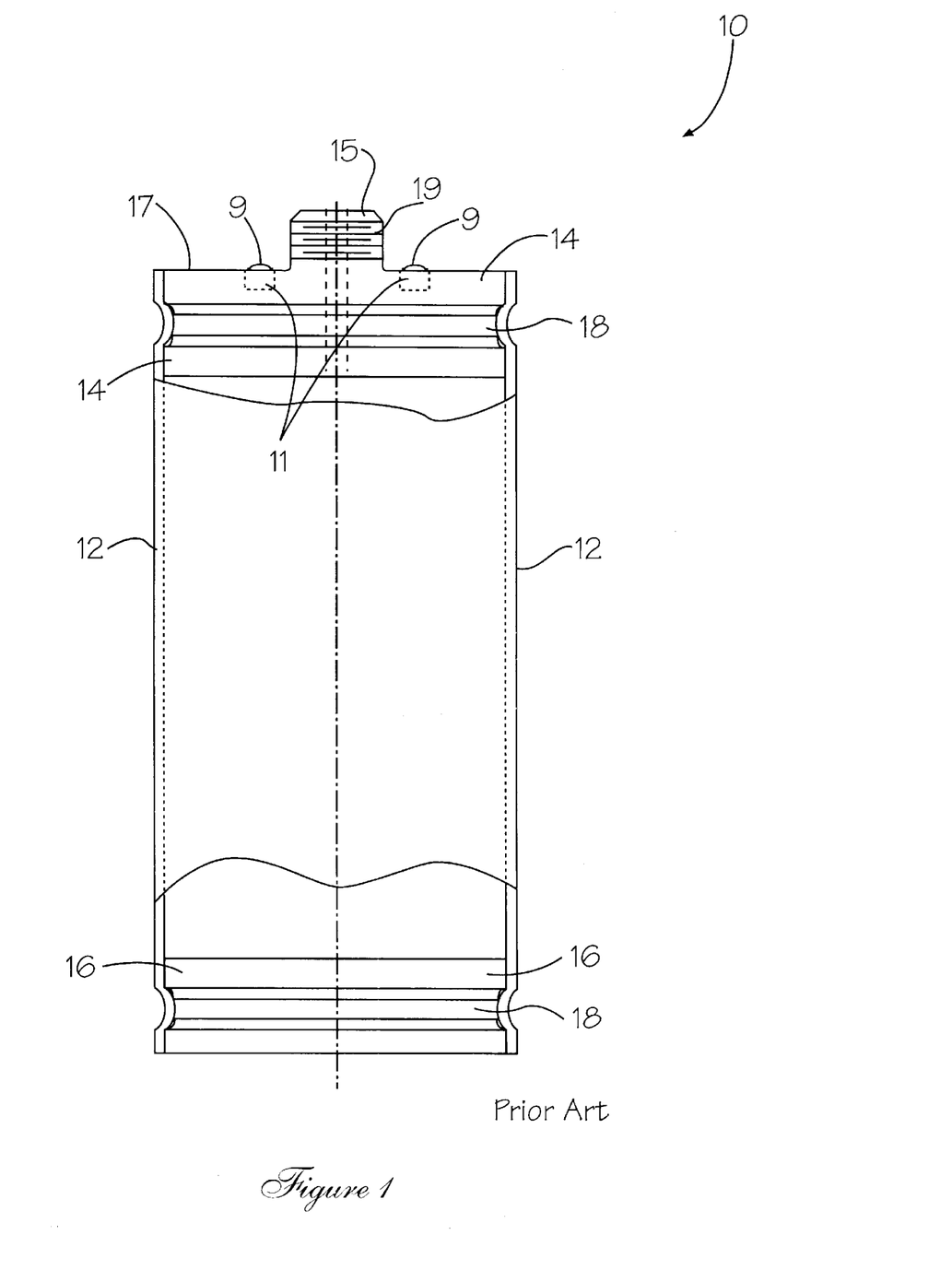
FIG. 1 illustrates a partially cut-away sectional view of a pressurizable canister of the prior art.

Now referring to FIG. 1, a pressurizable canister 10, in accordance with the prior art, is shown. The canister 10 comprises a thin-walled aluminum shell 12. The shell 12 is mechanically formed about a pair of end caps 14 and 16, respectively, using an electromagnetic forming process disclosed in U.S. Pat. No. 5,979,694.

The electromagnetic pulse forming process is well known, and is described in U.S. Pat. Nos. 3,837,755 and 4,523,872. The aluminum is mechanically deformed into the joints or recess 18 of each end cap 14 and 16, respectively. The end caps 14 and 16 are injection molded from a ductile, high-strength thermoplastic.

The end caps 14 and 16, respectively, are each injection molded with the recess 18 disposed in a circumferential surface thereof, as shown. The metal of the shell tube,12 deforms into the recess 18, thus forming a strong mechanical seal. The top end cap 14 may have a mounting abutment 15 extending from a facial surface 17 thereof. The mounting abutment 15 has screw threads 19 molded therein. A concentric groove or recess 11 is disposed on the facial surface 17 in close proximity to the abutment 15. An O-ring 9 is disposed in the groove 11 to enhance the facial seal of the canister 10 with the article to which it is intended to supply the pressurized material, not shown.

Figure 2:
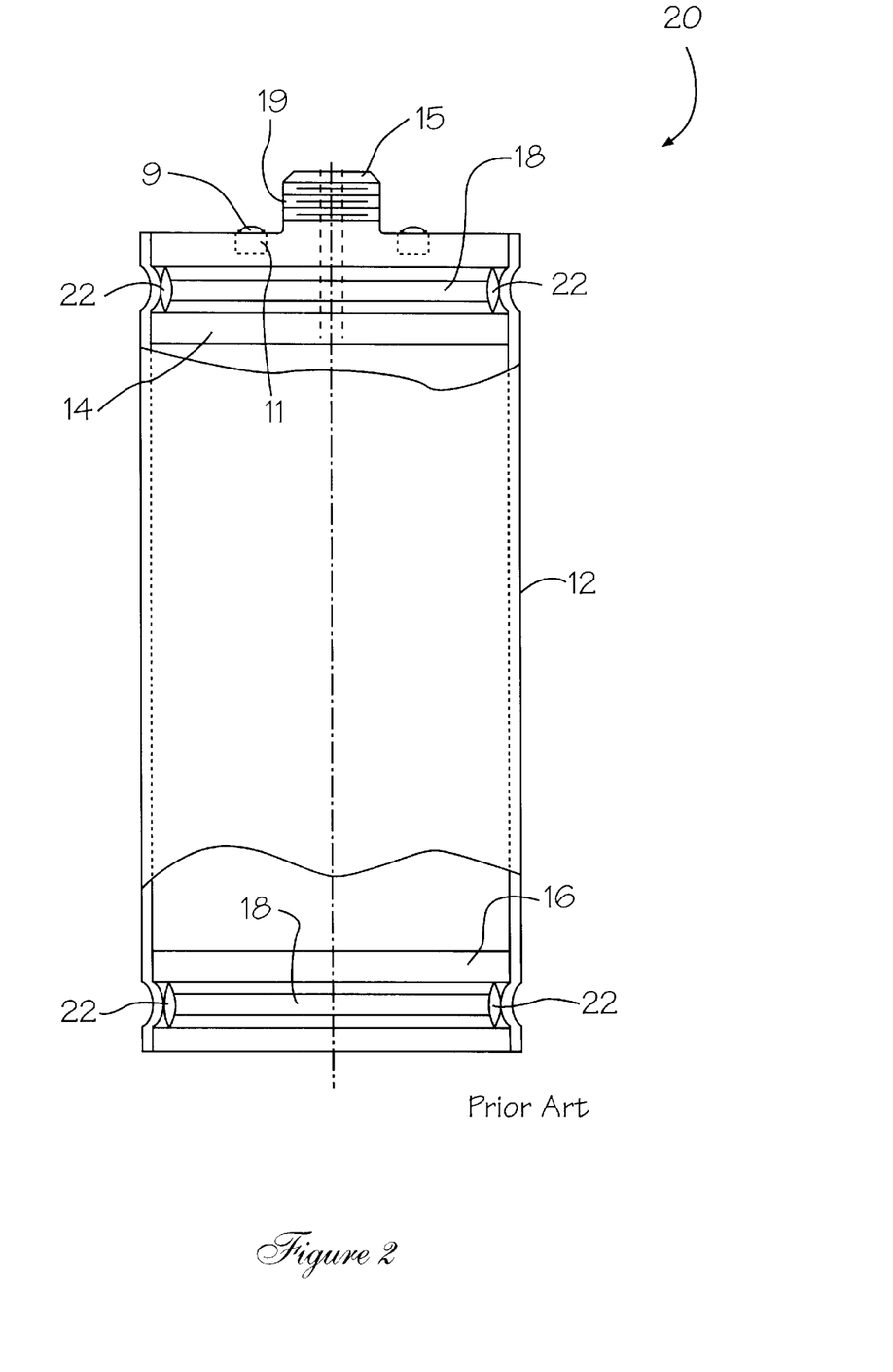
FIG. 2 depicts a partially cut-away sectional view of an alternate embodiment of the prior art pressurizable canister shown in FIG. 1.

Referring to FIG. 2, a sectional view is illustrated of an alternate embodiment 20 of the prior art canister 10 shown in FIG. 1. The canister 20 comprises an O-ring 22 in each of the respective recesses 18 of end caps 14 and 16. The added O-rings 22 are respectively trapped in the recesses 18, and provide an enhanced sealing between the deformed shell 12 and the end caps 14 and 16, respectively. A better view of the O-ring sealing arrangement can be seen with reference to FIGS. 3, 4 and 6.

Figure 3:
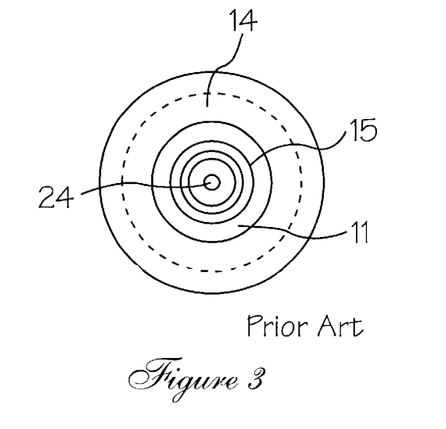
FIG. 3 illustrates a top view of the prior art canisters depicted in FIGS. 1 and 2.
Figure 4:
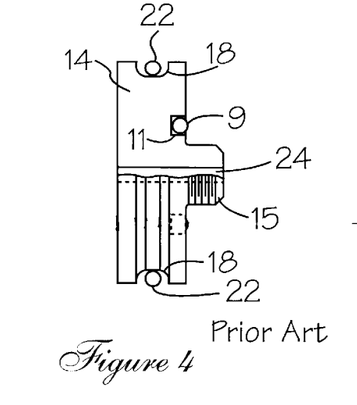
FIG. 4 shows a side view of the top end cap of the prior art canisters illustrated in FIGS. 1 and 2.

Referring to FIGS. 3 and 4, the top end cap 14 is shown in top and side views, respectively. The recess 18 is shown in more detail, and contains O-ring 22. FIG. 4 also illustrates the facial groove 11 and O-ring 9. These FIGURES also depict a passage 24 running through the abutment 15 and end cap 14. The passage 24 allows the pressurized material to pass from the canister 20 into the intended article receiving the stored, and subsequently discharged, materials.

Figure 5:
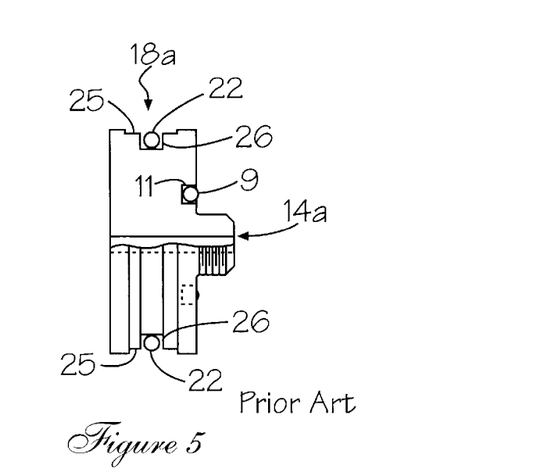
FIG. 5 depicts a side view of an alternate embodiment of the prior art end cap shown in FIG. 4.

Referring to FIG. 5, an alternate embodiment 14a is shown for prior art end cap 14 (FIGS. 3 and 4). The end cap 14a is illustrated with a circumferential recess 18a, which has a double groove represented by grooves 25 and 26, respectively. The second groove 26 captures the O-ring 22 with greater facility.

Figure 6:
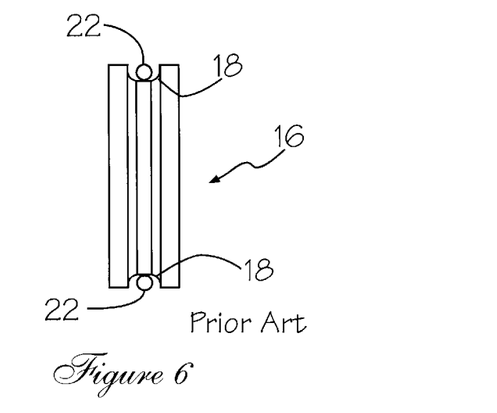
FIG. 6 illustrates a side view of the bottom end cap of he the prior art canisters shown in FIGS. 1 and 2.

Referring to FIG. 6, the bottom end cap 16 of the respective canisters 10 or 20 is shown in more detail. The circumferential groove 18 is shown with O-ring 22.

Figure 7:
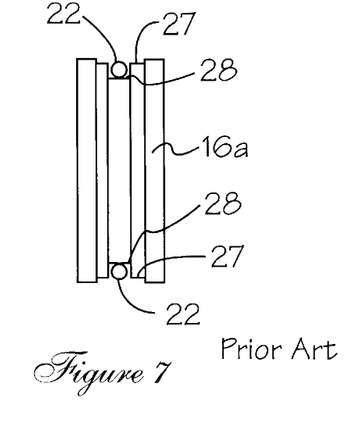
FIG. 7 shows a side view of an alternate embodiment of the prior art bottom end cap depicted in FIG. 6.

Referring to FIG. 7, an alternate embodiment 16a is illustrated of the prior art end cap shown in FIG. 6. The end cap 16a features a double groove, comprising respective first and second grooves 27 and 28. The O-ring 22 is better captured in the second groove 28, thus enhancing the seal.

Figure 8:
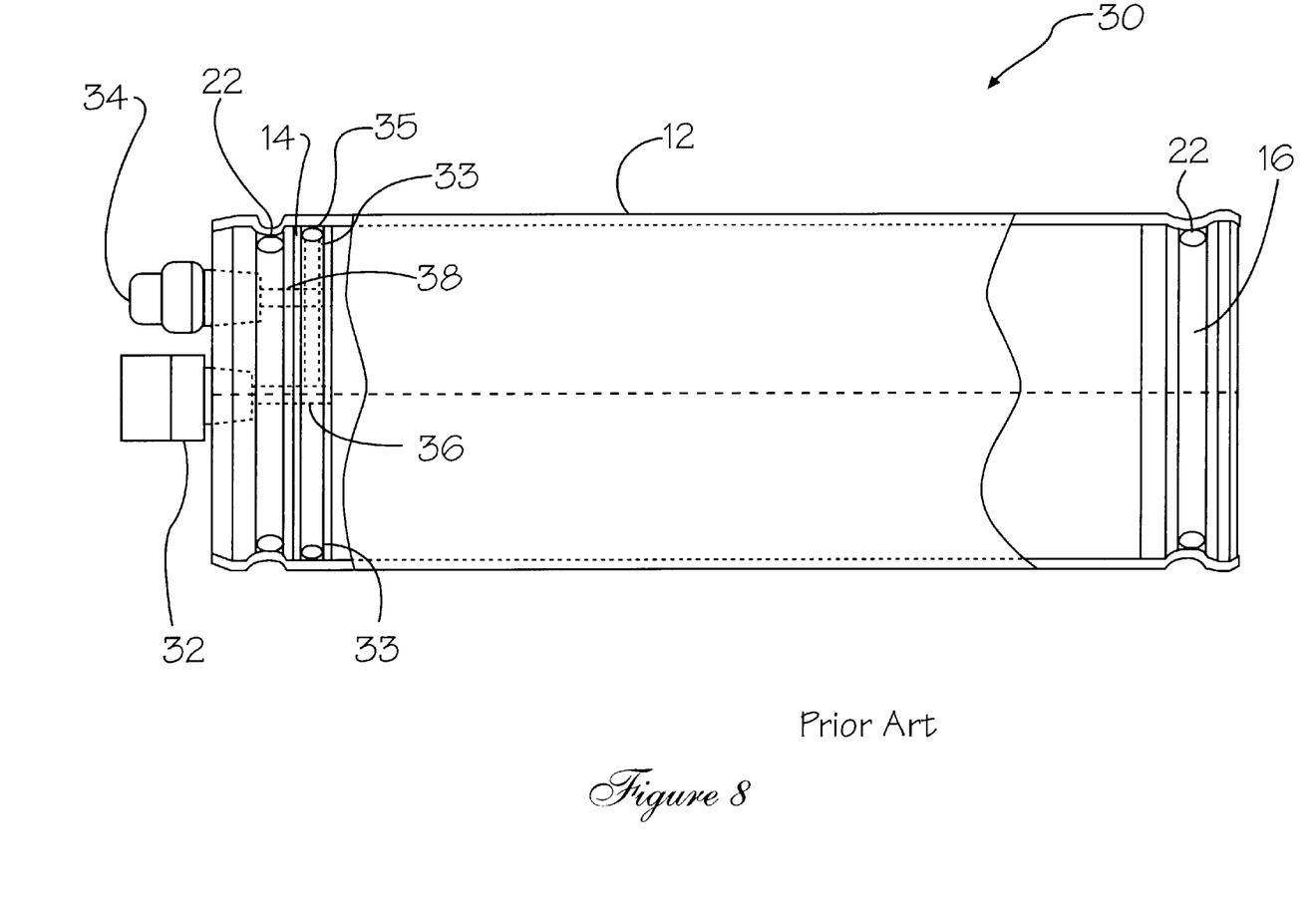
FIG. 8 illustrates a partially cut-away sectional view of an alternative embodiment of a prior art pressurizable canister that incorporates both a quick disconnect and a pressure relief valve in the same end cap.

Referring to FIG. 8, a second alternate embodiment 30 of the prior art canister 10 of FIG. 1 is illustrated. The canister 30 comprises a quick disconnect outlet 32 and a pressure relief valve 34, each of which is disposed in the top end cap 14. Both the quick disconnect outlet 32 and the pressure relief valve 34 are screwed into the top end cap 14, via internally threaded bores 36 and 38, respectively. Bore 36 for the quick disconnect outlet 32 passes completely through the top end cap 14, thus communicating with the interior of the canister body 12.

Figure 9:
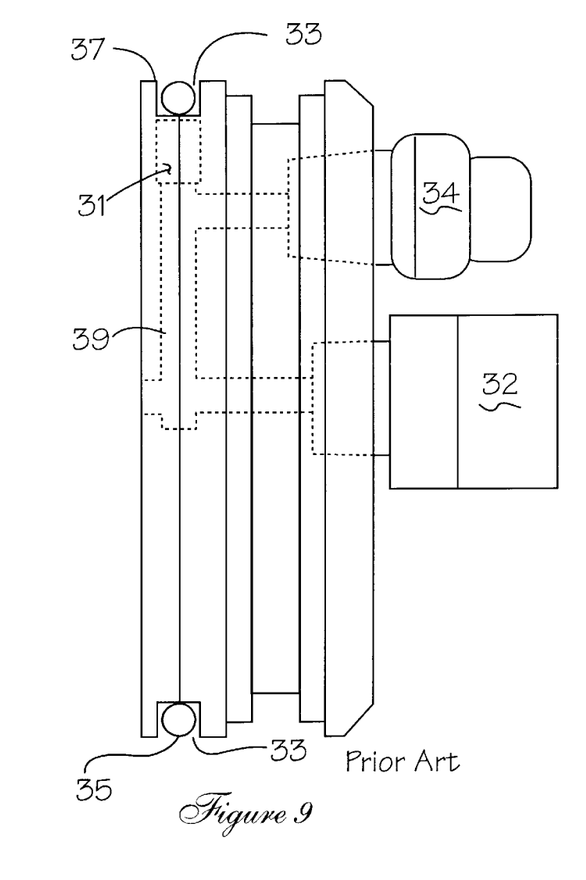
FIG. 9 is a side view of the alternative prior art end cap shown in FIG. 8.
Figure 10:
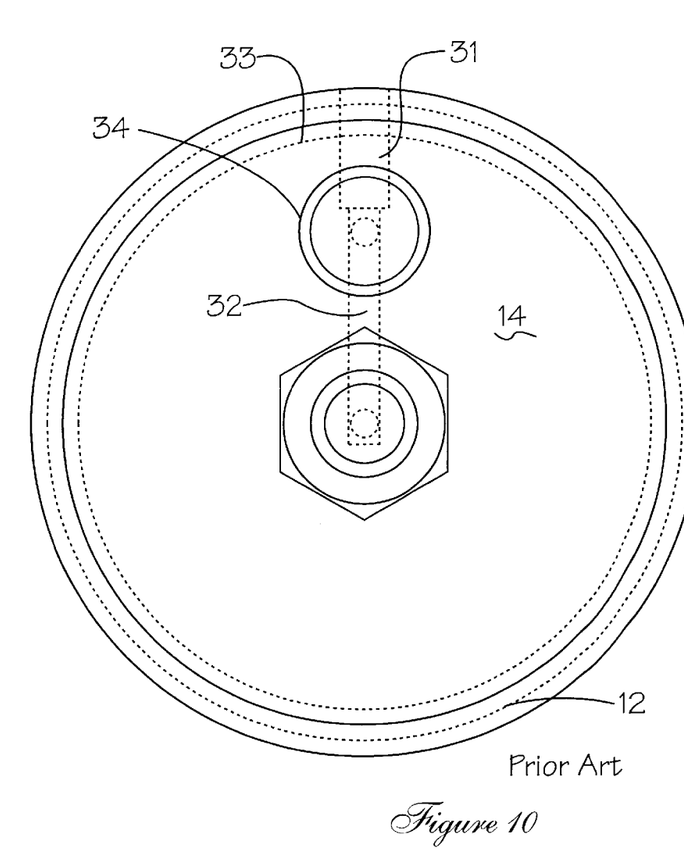
FIG. 10 is a top view of the alternative prior art end cap shown in FIGS. 8 and 9.

Bore 38 for the pressure relief valve 34 is a blind hole that ends within the body of the top end cap 14, as better observed with reference to the enlarged view of the end cap depicted in FIGS. 9 and 10. A cross-channel 39 is drilled in the side of the top end cap 14 prior to electromagnetic forming, to provide communication between bores 36 and 38. The quick disconnect outlet 32 is used to draw off the hydrogen produced by the hydride contained within the body 12 of the canister 30. In the event that the pressure becomes excessive, the pressure relief valve 34 will vent the excessive hydrogen build-up, to prevent damage to the canister 30, via the cross-channel 39.

The top end cap 14 is additionally provided with a second circumferential groove or recess 33 that accommodates a wiper O-ring 35. The wiper O-ring 35 prevents hydride material from passing between the end cap 14 and the aluminum body 12.

Referring again to FIG. 9, a set screw or pressure plug 37 is provided for adjusting the escape of hydrogen in channel 39. The pressure plug 37 extends into the channel 39 at point 31, and pinches off the channel 39 in order to adjust the pressure feed.

Figure 11:
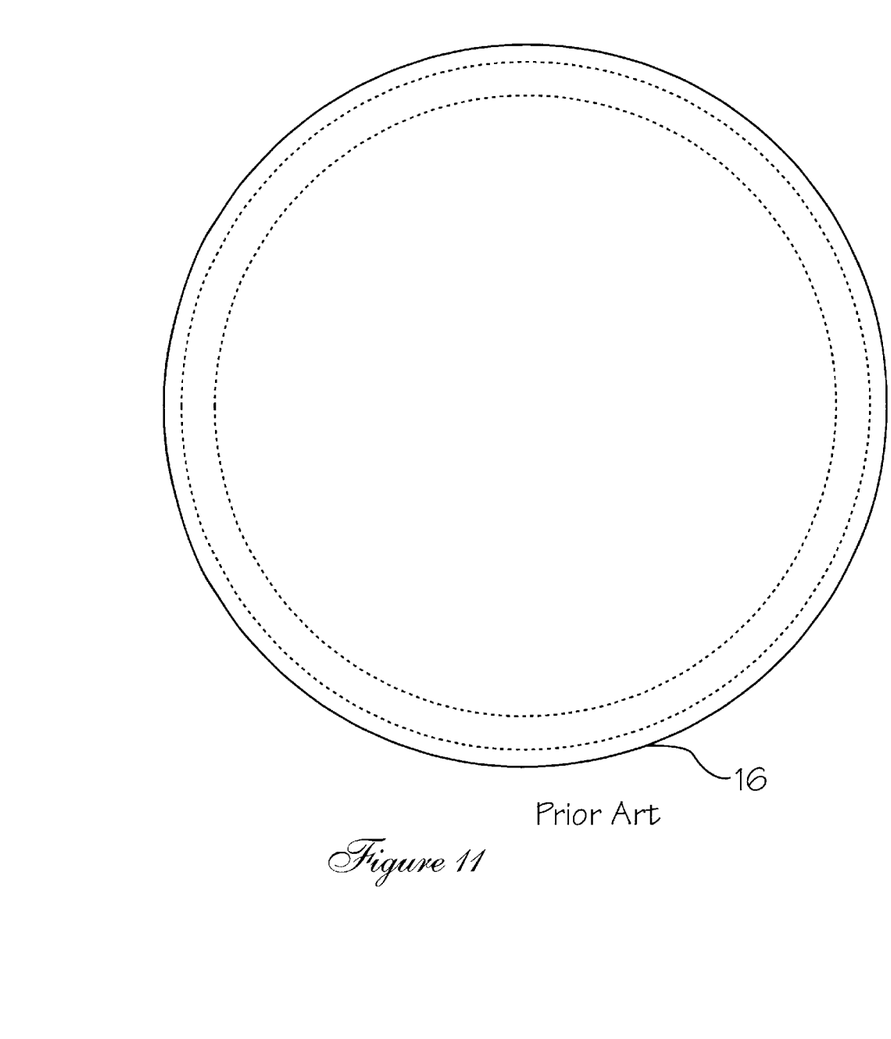
FIG. 11 is a top view of the other end cap of the prior art canister depicted in FIG. 8.
Figure 12:
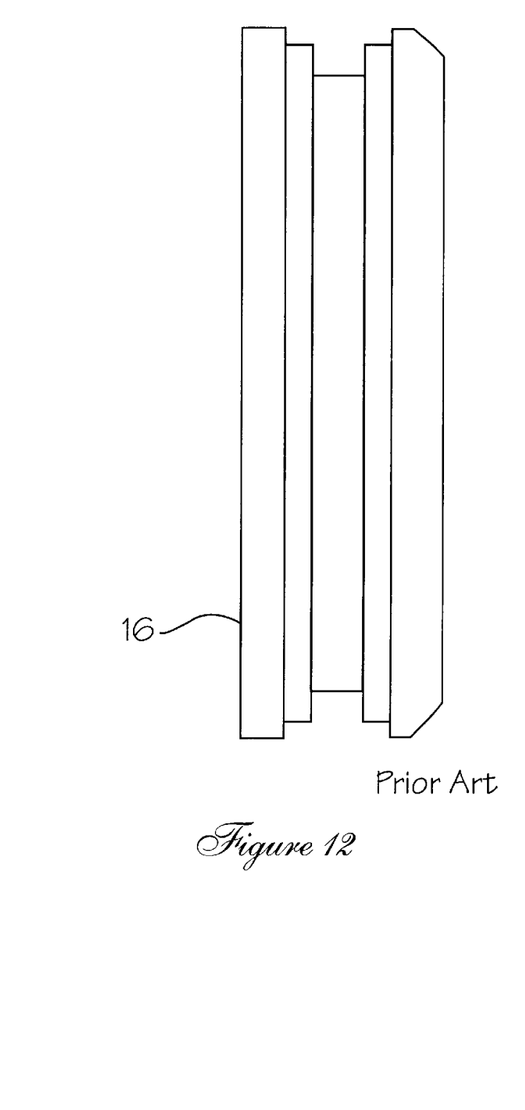
FIG. 12 is a side view of the prior art end cap shown in FIG. 11.

Referring to FIGS. 11 and 12, the bottom end cap 16 is shown in plan and side views, respectively.

Figure 13:
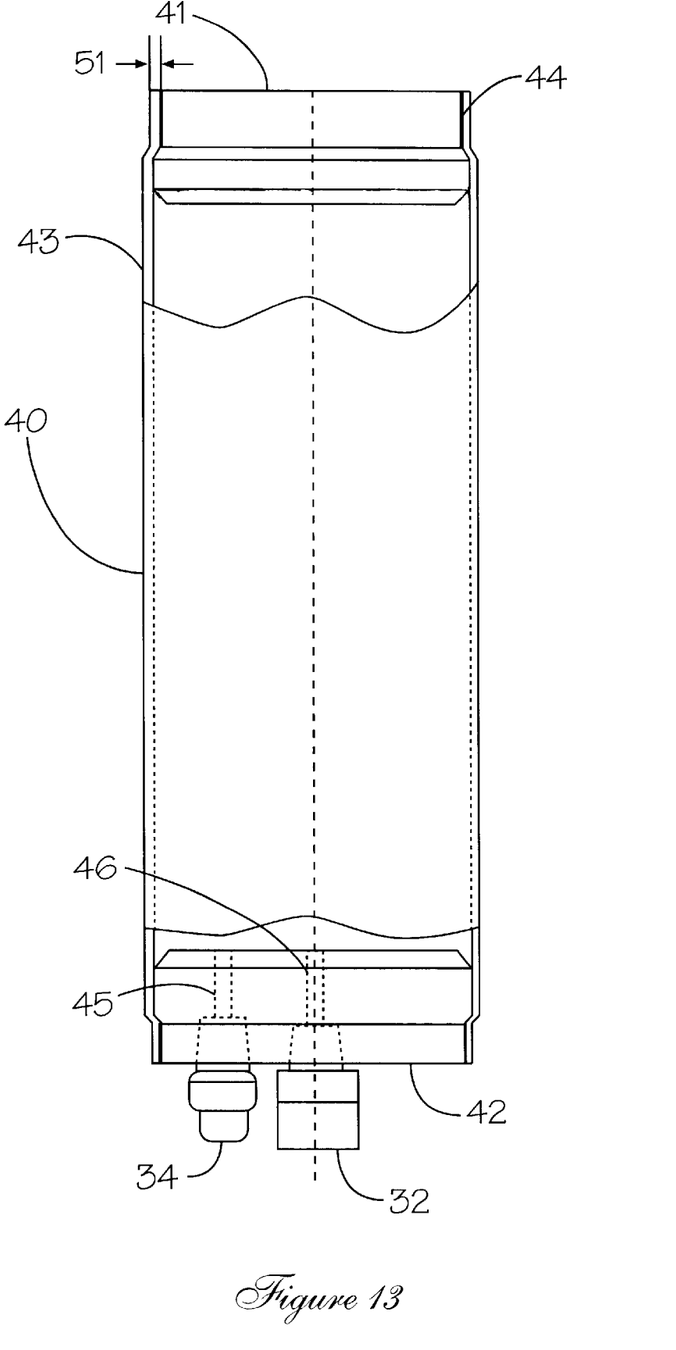
FIG. 13 illustrates a partially cut-away, sectional view of the pressurizable canister of the present invention, wherein end caps are permanently assembled to the metal shell body using magnetic pulse welding.

Now referring to FIG. 13, a pressurizable canister 40, in accordance with the invention, is shown. The canister 40 comprises a thin-walled, metallic (preferably aluminum) shell or tube 43. The shell 43 is cold-welded to a pair of end caps 41 and 42, respectively, using the magnetic pulse welding process. Again, end caps 41 and 42 are preferably made of high strength, lightweight metallic alloy such as aluminum, but may be cast, forged, or machined from steel, titanium, stainless steel, or many other ferrous or non-ferrous materials.

The magnetic pulse welding process is well known, and is described in U.S. Pat. No. 3,520,049 issued to Lysenko et al. and U.S. Pat. No. 5,981,921 issued to Yablochnikov. The interaction of opposing magnetic fields during the magnetic pulse welding process imparts high kinetic energy radially inward into the aluminum shell 43, so as to impart a high collapse velocity in the tube 43 in the weld zone 57. The tube 43 traveling at high velocity, impacts each end cap 41 and 42. The heat generated from this impact fuses the tube aluminum to the end caps 41 and 42 creating an intermolecular bond at the interface 44 between the tube 43 and end fittings 41 and 42. No intervening material is present. Moreover, no O-rings are required. The entire process takes place without heat applied, so there is no annealing of the aluminum material.

The result is a hermetic seal that has been tested to pressures above 2,000 psi without failure. Since the cylindrical shell 43 is not annealed in the highly stressed joint area 44, greatly reduced wall thickness of shell 43 is possible, as compared to conventional welding processes that use heat. Unlike conventional welding, the thickness of the wall is not limited by the welding process or subsequent annealing effects. The wall thickness for magnetic pulse welded canisters is thus dictated by the size of the canister and its interval pressure. For handling considerations (to resist denting or other damage) canisters with outer diameters of approximately 2 inches have a wall thickness of 0.035 inches or greater.

As aforementioned, the end caps 41 and 42 can be made of most metallic alloys, but the preferred alloy is aluminum for cost and weight considerations. In the case where the caps 41 and 42 are made of an alloy other than aluminum, a new alloy that combines the molecules of the aluminum shell 43 with the end cap alloy is created at the weld zone 44.

The end fittings 41 and 42 are reduced in diameter in the weld zone 44 so as to create a uniform gap 51 between the tube 43 and fittings 41 and 42 prior to the magnetic pulse welding process. This gap 51 is required to accelerate the shell material 43 prior to impact with end fittings 41 and 42.

FIG. 13 also depicts a quick disconnect 32 and pressure relief valve 34. In this instance, the greater impact strength of aluminum material, as compared to the prior art non-metallic end caps (FIGS. 1 through 12) eliminates the need for the cross-channel 39 and pressure plug 37 (FIG. 9). Bore 45 for quick disconnect 32 passes completely through end cap 42. Bore 46 for pressure relief valve 34 also passes completely through end cap 42. Unlike the configuration of the prior art (FIG. 12), there is no need for a cross-drilled hole between the quick disconnect 32 and pressure relief valve 34. This feature is not required when end caps 41 and 42 are made of metals such as aluminum. Alternatively, pressure relief valve 34 could be located in the opposite end cap 41.

Figure 14:
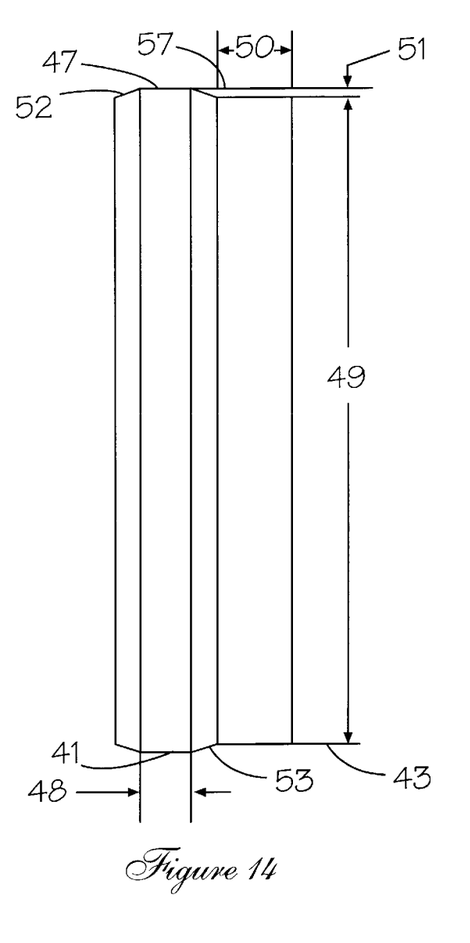
FIG. 14 shows a side view of the top end cap of the canister depicted in FIG. 13.
Figure 15:
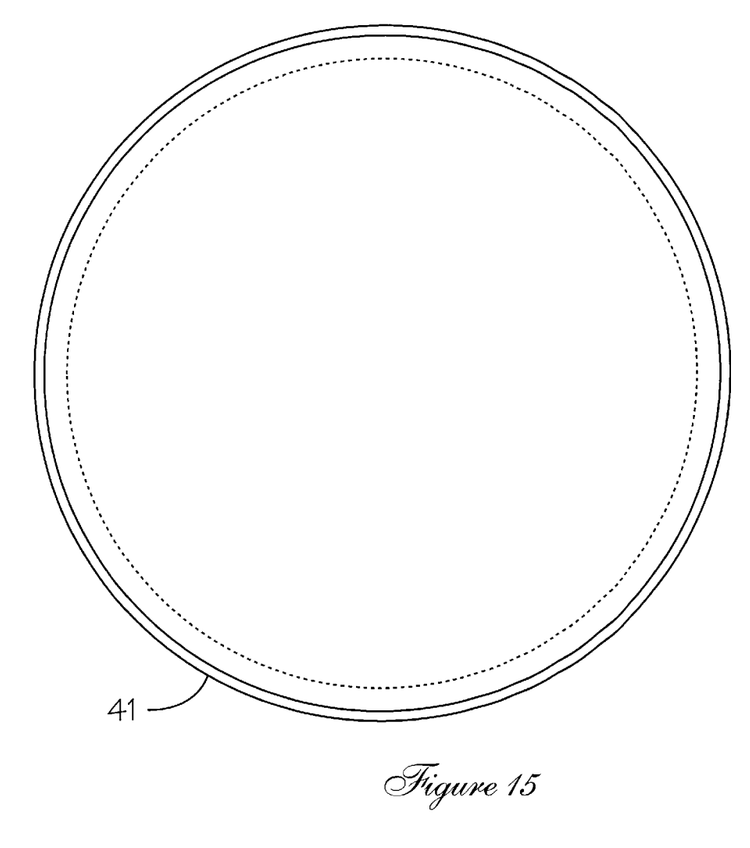
FIG. 15 is the top view of the top end cap depicted in FIG. 13.

Referring to FIGS. 14 and 15, end cap 41, as shown in top and side views, generally consists of a cylindrical surface 47 of predetermined thickness 48, and a reduced diameter surface 49 of the weld zone 57 having predetermined dimension 50. The reduced diameter portion 49 creates a uniform circumferential gap 51 when the end fitting 41 is inserted into the canister shell 43 (FIG. 13). Moreover, cylindrical surface diameter 47 is slightly larger than the inner diameter of the cylindrical shell 13 so as to create an interference fit. The dimensions 48 of cylindrical surface 47 and the interference fit thus create a self-aligning feature between the end fitting 41 and tube 43 so as to ensure a uniform gap 51. This is important to ensure a uniform weld about the circumference of end fitting 41 in weld zone 57. Cylindrical surface 47 is bounded by a tapered or conical surface 52 on the inboard side (the side which is first inserted into the canister shell 43) and a second conical surface 53 that forms a gradual transition between cylindrical surface 47 and reduced diameter 49. Conical surface 52 aids in inserting end cap 41 in the shell 43, overcoming the resistance created by the interference fit.

Figure 16:
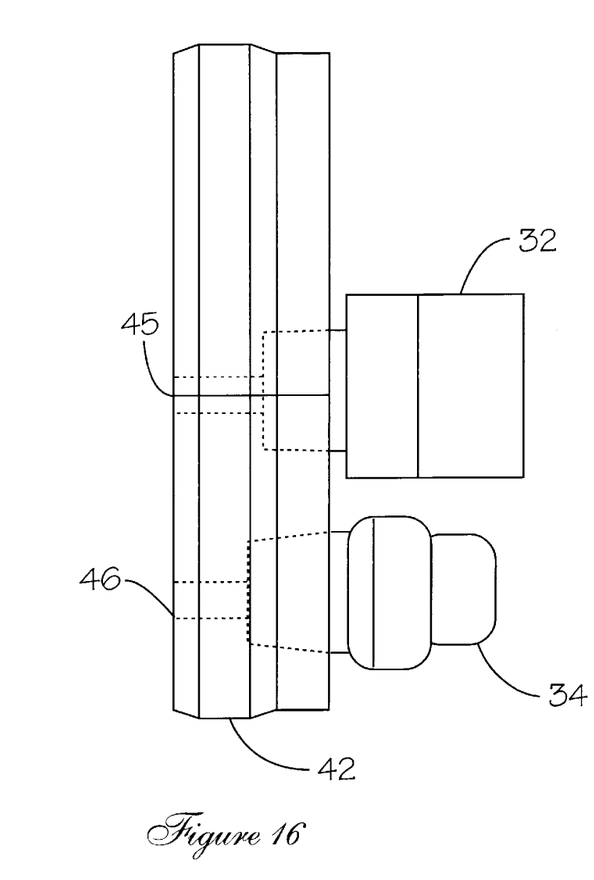
FIG. 16 is the side view of the bottom end cap depicted in FIG. 13.
Figure 17:
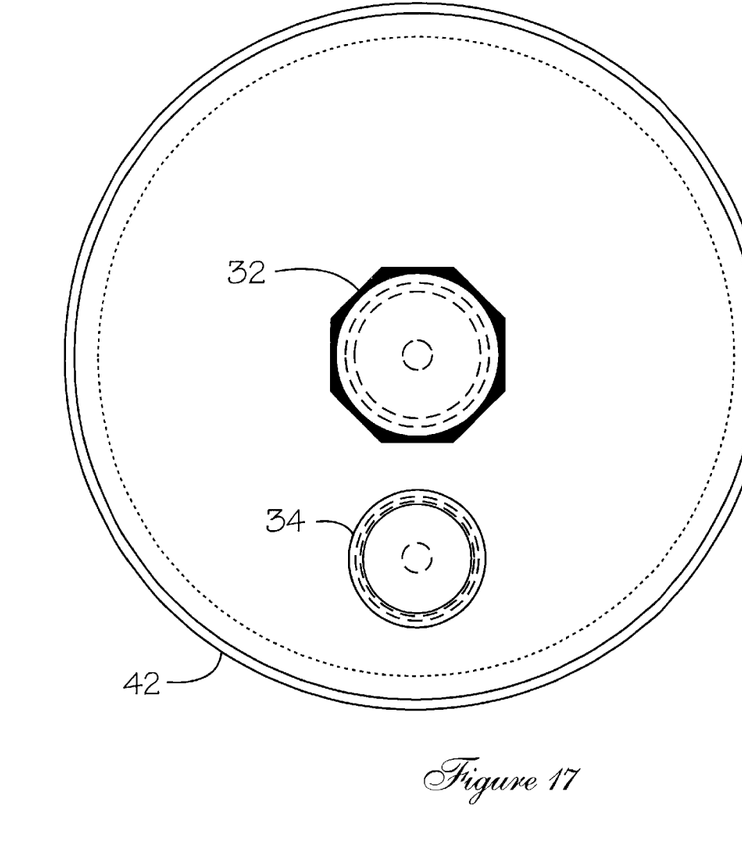
FIG. 17 is the bottom view of the bottom end cap depicted in FIG. 13.

FIGS. 16 and 17 depict side and bottom views, respectively, of bottom end cap 42, which includes quick disconnect 32 and pressure relief valve 34 with respective bores 45 and 46.

Figure 22:
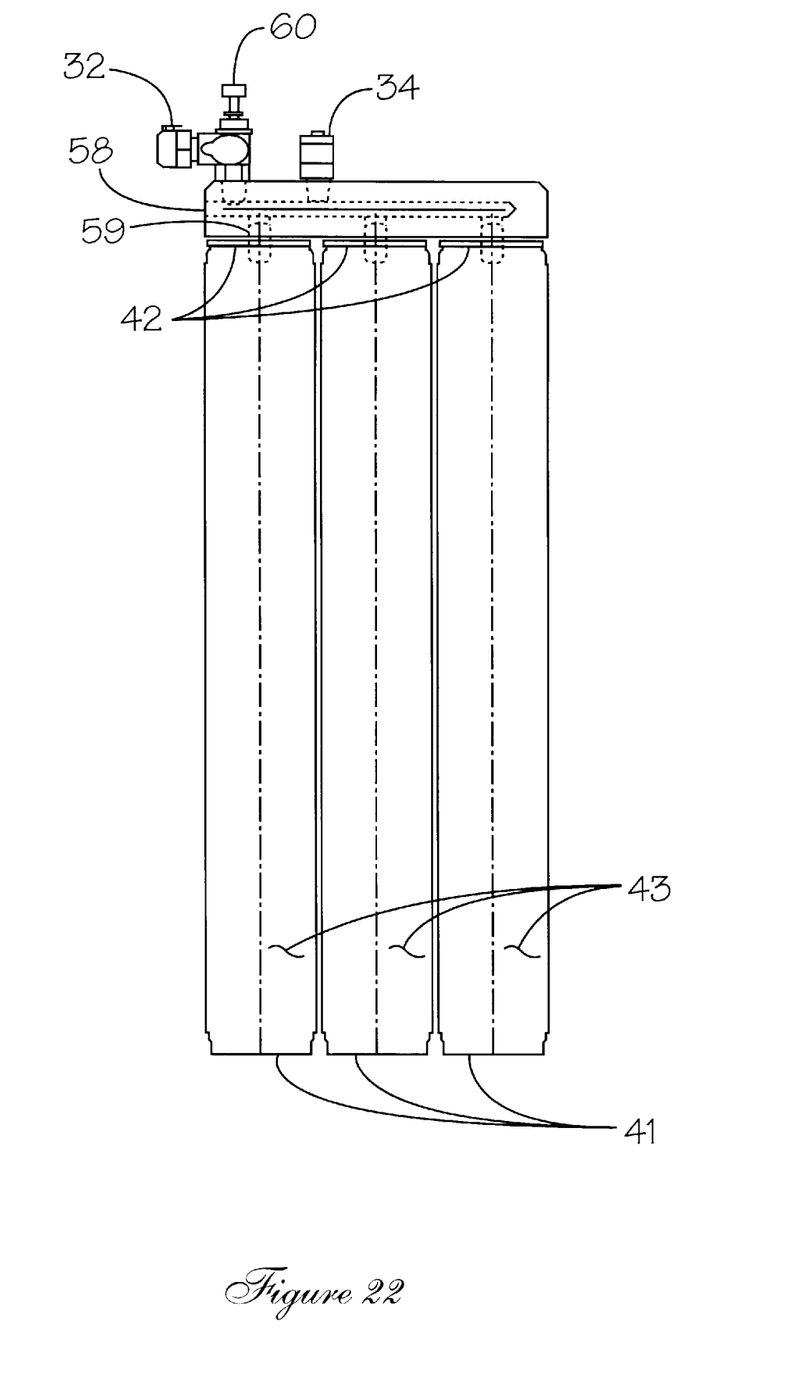
FIG. 22 is an assembly drawing of three magnetic pulse welded canister assemblies as shown in FIG. 13 joined to a common manifold via pipe nipples.

Alternatively, as depicted in FIG. 22, an assembly can be made of multiple canisters 20 attached to a manifold 58 via pipe nipples 59 and one or more pressure relief valves 34 and quick disconnect 32 used on the manifold 58. A shutoff valve or flow control valve 60 can be used between the manifold 58 and the quick disconnect 32 to act as a redundant shutoff and to assist in the charging of the pressure canisters. This would be advantageous in terms of cost and packaging.

Figure 18:
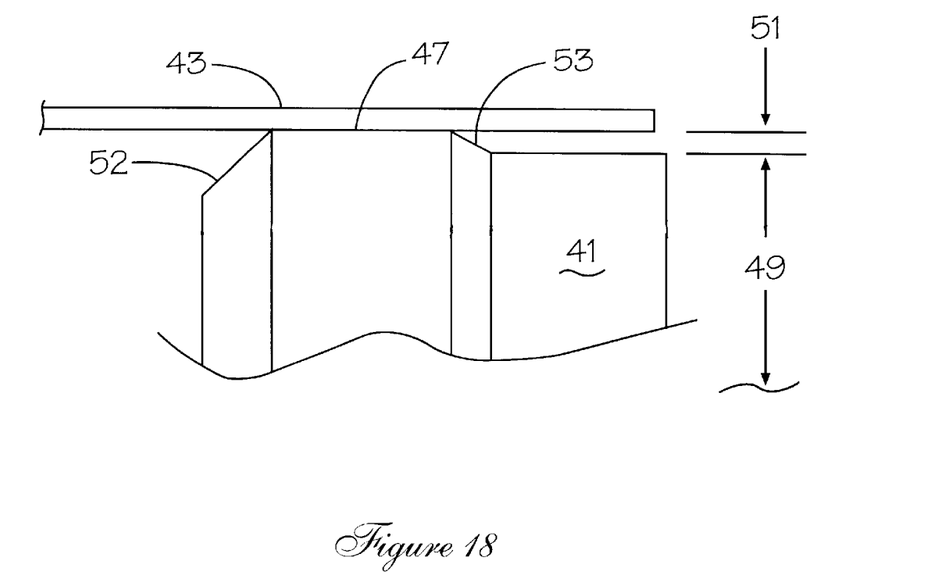
FIG. 18 is a partial sectional view of the bottom end cap and metal shell prior to magnetic pulse welding.

Now referring to FIG. 18, the bottom end cap 41 is inserted into the metal shell 43 with a slight interference fit with the cylindrical surface 47, thus creating a self-centering feature to maintain a uniform circumferential gap 51. Tapered conical surface 52 aids in the insertion of the end cap 41 into the inner diameter of the tube. Conical surface 53 between surface 47 and reduced diameter 49, in addition to forming a smooth transition between surfaces, allows for a small cavity, discussed below, to collect impurities formed by the self-cleaning nature of the sequential magnetic pulse welding process.

Figure 19:
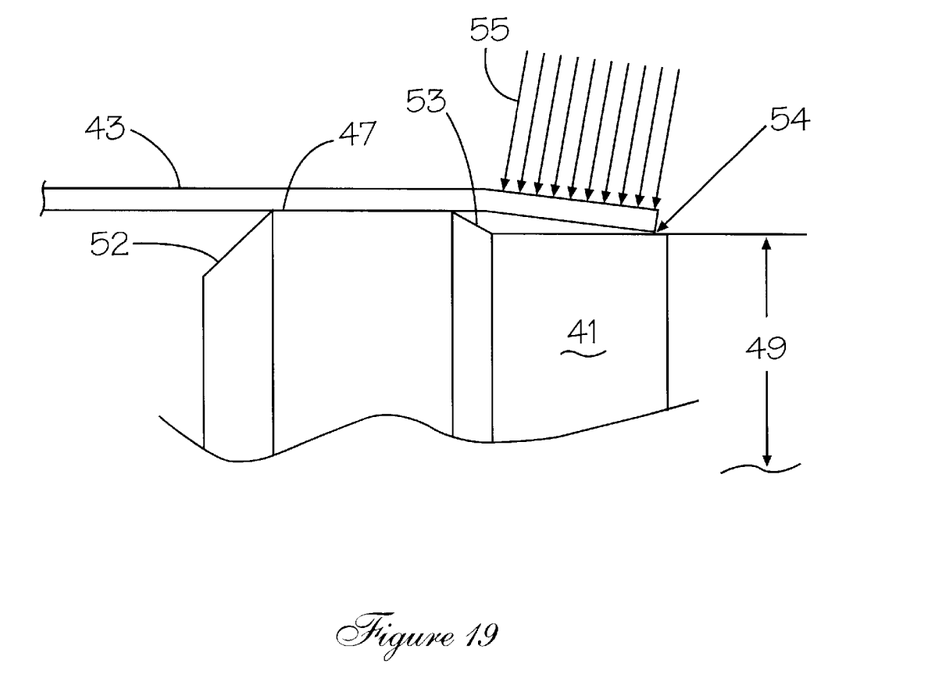
FIG. 19 is a partial sectional view of the bottom end cap and metal shell at the instant when the magnetic pulse welding sequence begins.

Referring to FIG. 19, the position of the end of the metal shell 43 at the initiation of the welding process is shown. Just after the metal shell 43 is pulsed with an electromagnetic field, forces acting radially inward cause the metal shell 43 to first contact the end cap 41 at the tube end 54. The angular impact of the metal shell 43 relative to the end cap creates a beneficial sequential welding action.

Figure 20:
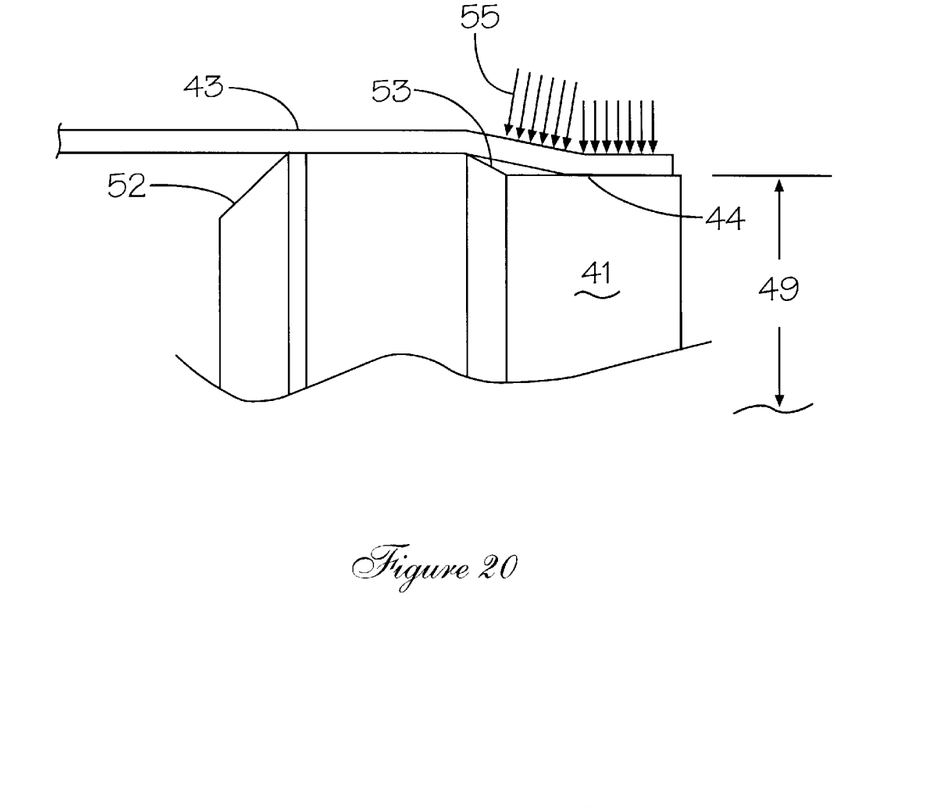
FIG. 20 is a partial sectional view of the bottom end cap and metal shell during the sequential magnetic pulse welding process.

FIG. 20 illustrates that the weld is created in a sequential fashion moving from the point of first contact 54 longitudinally inward. As the weld progresses, the wedging action created by the angular impact between metal shell 43 and end cap 41 creates tangential as well as perpendicular forces at the interface, thus creating a self-cleaning action at the weld interface. As in any welding process, the cleaner the adjoining surfaces at the time the welding occurs, the better the-quality of the weld. Also, because of the angular impact of the metal shell 43 with the end cap 41, the depth and width of the intermolecular bond of materials is unequalled. This is because, due to the sequential nature of the process, the impact pressure is great due to the small area welded at any instant.

Figure 21:
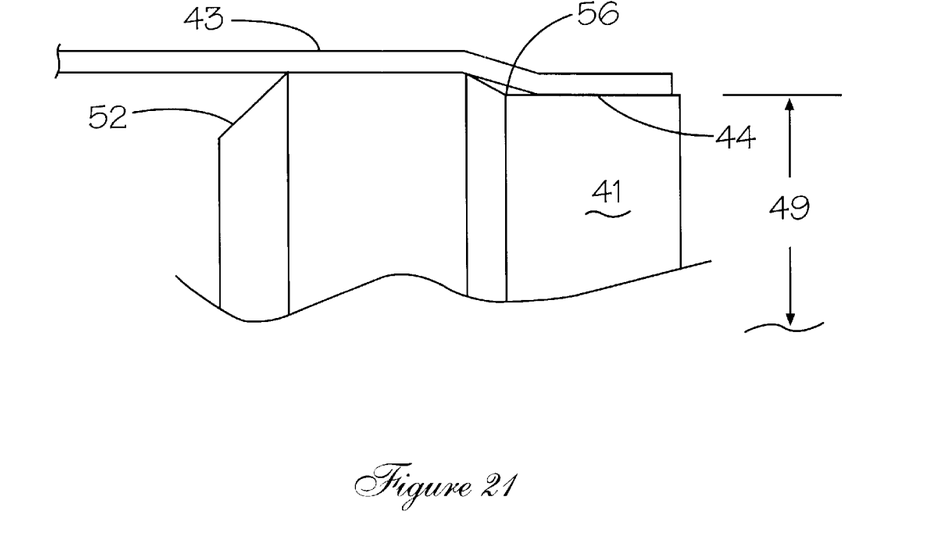
FIG. 21 is a partial sectional view of the bottom end cap and metal shell at the completion of the sequential magnetic pulse welding process.

Now referring to FIG. 21, the completed weld is illustrated. Note the pocket created by sloped surface 53 and reduced diameter 49. This pocket retains impurities 56 that are deposited after the welding is completed. It is impossible for the metal shell 43 to completely form or weld into this pocket. If this area did not exist, it would not be possible to remove the impurities from the weld interface.

FIG. 22 illustrates an efficient means of creating an efficient, high capacity, magnetic pulse canister system that is more readily packaged into a flat system as opposed to a single, large diameter pulse welded canister. This system is also advantageous in that three canisters share a single quick disconnect 32 and pressure relief valve 34 through the use of a manifold 58. As in FIG. 13, each canister 40 consists of end caps 41 and 42 joined to the shell 43 via magnetic pulse welding. Standard pipe nipples 59 join the canisters 40 to the manifold 58. The preferred material for the manifold 58 is aluminum for weight considerations. A shutoff valve or flow control valve 60 can be used between the manifold 58 and the quick disconnect 32 to act as a redundant shutoff and to assist in the charging of the pressure canisters.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to it be protected by Letters Patent is presented in the subsequently appended claims.

What is claimed is:

1. A pressure vessel, comprising a pressurizable canister, said canister comprising:
   a) a hollow, thin-walled, lightweight, cylindrical metal shell, said metal shell having an inside diameter;
   b) two distally disposed, substantially cylindrical, metallic alloy end caps comprising a top end cap and a bottom end cap, respectively, each of said end caps comprising a first portion having a first diameter slightly larger than said inside diameter of said cylindrical metal shell, said first diameter being selected to provide an interference fit with said inside diameter when said first portion of said end cap is inserted into said metal shell, and a concentric second portion having a second diameter smaller than said first diameter, said second diameter being selected so as to leave a predetermined, uniform gap between a circumferential surface of said second portion and an inside surface of said wall of said cylindrical metal shell when said second portion is substantially completely inserted thereinto;

said metal shell being hermetically sealed to each respective, end cap by a process of magnetic-pulse welding.

2. The pressure vessel of claim 1, wherein at least one of said metallic alloy, and said metal shell of said canister comprises aluminum.

3. The pressure vessel of claim 1, wherein said canister can accommodate a pressure of at least approximately 1,800 psi.

4. The pressure vessel of claim 1, further comprising at least one of the devices: a quick disconnect-outlet disposed in said bottom end cap for drawing off gaseous materials from within said pressure vessel; and a pressure relief valve disposed in at least one of said top end cap and said bottom end cap for relieving excess pressure in said pressure vessel.

5. The pressure vessel of claim 4, wherein said pressure relief valve comprises means for adjusting said excess pressure.

6. The pressure vessel as recited in claim 1, wherein said end caps further comprise a transitional region-disposed between said first portion and said second portion of said end caps along a longitudinal axis thereof.

7. The pressure vessel as recited in claim 1, wherein circumferential surfaces of both said first portion and said second portion of said end caps are substantially parallel to said inside wall of said shell after insertion of said end caps thereinto.

8. The pressure vessel as recited in claim 1, wherein said end caps further comprise a tapered, conical surface at an inboard end of said first portion thereof disposed to aid insertion of said first portion of said end cap into said metal shell.

9. The pressure vessel as recited in claim 1, wherein said first portion of each of said end caps self-centers itself within said hollow metal shell upon insertion thereinto.

10. The pressure vessel as recited in claim 6, wherein after said process of hermetically sealing each respective end cap to said metal shell using magnetic pulse welding, a cavity remains between said transitional region of said end cap and said inside wall of said metal shell.

11. The pressure vessel as recited in claim 10, wherein said cavity serves to collect impurities formed during said magnetic pulse welding process.

12. A pressure vessel, comprising a pressurizable canister, said canister comprising a hollow, thin-walled, lightweight, cylindrical metal shell having an inside diameter, and a top end cap and a bottom end cap, each of said top end cap and said bottom end cap being substantially cylindrical and comprising a first portion having a first diameter slightly larger than said inside diameter of said cylindrical metal shell, said first diameter being selected to provide an interference fit with said inside diameter when said first portion of said end cap is inserted into said metallic metal shell, and a concentric second portion having a second diameter smaller than said first diameter, said second diameter being selected so as to leave a predetermined, uniform gap between a circumferential surface of said second portion and an inside surface of said wall of said cylindrical metal shell when said second portion is substantially completely inserted thereinto, said circumferential surface of said second portion and an inside surface being disposed substantially parallel to one another, said metal shell being formed so as to create an intermolecular bond at the interface between said shell and said respective second portions of said top end cap and said bottom end cap, respectively; said metal shell being hermetically sealed to each of said respective second portions of said end caps by a process of magnetic pulse welding, said respective end caps comprising a high-strength, lightweight, metallic alloy that withstands the magnetic pulse welding process and allows for an intergranular fusion of shell and end cap materials in the absence of applied heat, whereby a permanent bond is established between said metal shell and said respective second portions of said end caps wherein the material of said shell and said end caps becomes integrally and directly bonded to one another with no intervening material therebetween.

13. The pressure vessel in accordance with claim 12, wherein at least one of said alloy, and said metal shell comprises aluminum.

14. A system of pressure vessels, comprising:
   a plurality of pressure vessels, as recited in claim 13, further comprising:
      a manifold;
      means for connecting each of said plurality of pressure vessels to said manifold; and
      at least one pressure relief valve operatively connected to said manifold for relieving excess pressure therein.

15. The system of pressure vessels in accordance with claim 14, wherein said means for connecting said pressure vessels to said manifold comprises pipe nipples.

16. A method for forming a light-weight pressure vessel, the steps comprising:
   a) providing a light-weight, cylindrical metal alloy shell having proximal and distal ends and a predetermined inside diameter;
   b) providing two substantially cylindrical metal end caps, each comprising a first portion having a first diameter slightly larger than said predetermined inside diameter of said cylindrical metal alloy shell, said first diameter being selected to provide an interference fit with an inside of a wall of said cylindrical metal alloy shell when said first portion of said end cap is inserted therein, and a concentric second portion having a second diameter smaller than said first diameter, said second diameter being selected so as to leave a predetermined, uniform gap between said second portion and an inside of said inside of said wall of said cylindrical metal alloy shell when said second portion is inserted therein;
   c) inserting a first of said two end caps completely into one of said distal and said proximal ends of said cylindrical metal alloy shell, said first portion being inserted first, said first portion substantially centering said end cap within said cylindrical metal alloy shell, thereby leaving a substantially uniform gap between a circumferential surface of said second portion and said inside of said cylindrical metal alloy shell, said circumferential surface of said second portion and said inside of said cylindrical metal alloy shell being disposed substantially parallel one another when said end cap is substantially completely inserted in said shell;
   d) electro-pulse welding said cylindrical metal alloy shell to said inserted end cap, a weld being formed substantially only between said circumferential surface of said second portion of said end cap and said inside surface of said shell; and
   e) repeating steps (c) and (d) by inserting a second one of said end caps into a remaining, unsealed one of said distal and said proximal ends of said cylindrical metal alloy shell;
whereby a pressure-tight, hermetic seal is formed by intergranular fusion of said cylindrical metal alloy shell and each of said two end caps in the absence of applied heat.

17. A pressure vessel, having a pressurizable canister, said canister comprising:
   a) a hollow, thin-walled, cylindrical aluminum shell, said aluminum shell having an inside diameter;
   b) two distally disposed, substantially cylindrical, aluminum end caps, each of said end caps comprising a first portion having a first diameter slightly larger than said inside diameter of said cylindrical metal shell, said first diameter being selected to provide an interference fit with said inside diameter when said first portion of said end caps is inserted into said metal shell, and a concentric second portion having a second diameter smaller than said first diameter, said second diameter being selected so as to leave a predetermined, uniform gap between a circumferential surface of said second portion and an inside surface of said wall of said cylindrical aluminum shell when said second portion is substantially completely inserted thereinto, said circumferential surface of said second portion and said inside surface of said wall of said cylindrical aluminum shell being disposed substantially parallel to one another when a respective one of said ends caps is inserted substantially completely into said aluminum shell;
said aluminum-shell being hermetically sealed to each of said second portions of said end caps by a process of magnetic pulse welding.

* * * * *